United States Patent [19]

Piejko et al.

[11] Patent Number: 5,229,455
[45] Date of Patent: Jul. 20, 1993

[54] POLYMER MIXTURES OF ALKYLMETHACRYLATE-GRAFTED ALKYLACRYLATE RUBBER WITH OLIGOEPOXIDE

[75] Inventors: Karl-Erwin Piejko, Bergisch-Gladbach; Hans-Eberhard Braese, Cologne; Otto Billinger, Linz am Rhein; Rolf Kubens, Odenthal, all of Fed. Rep. of Germany

[73] Assignee: Bayer Aktiengesellschaft, Leverkusen, Fed. Rep. of Germany

[21] Appl. No.: 755,754

[22] Filed: Sep. 6, 1991

[30] Foreign Application Priority Data

Sep. 18, 1990 [DE] Fed. Rep. of Germany ........ 4029535

[51] Int. Cl.⁵ ...................... C08L 33/10; C08L 33/12; C08L 51/04
[52] U.S. Cl. ........................................ 525/65; 523/438
[58] Field of Search ............................................ 525/65

[56] References Cited

U.S. PATENT DOCUMENTS

| | | | |
|---|---|---|---|
| 3,856,883 | 12/1974 | Dickie et al. | 525/64 |
| 4,853,433 | 8/1989 | Blum et al. | 525/65 |
| 5,047,473 | 9/1991 | Piejko et al. | 525/85 |
| 5,096,966 | 3/1992 | Piejko et al. | 525/64 |
| 5,104,935 | 4/1992 | Leitz et al. | 525/64 |

FOREIGN PATENT DOCUMENTS

| | | | |
|---|---|---|---|
| 0688029 | 6/1964 | Canada | 525/65 |
| 2121636 | 8/1972 | France . | |
| 2292742 | 6/1976 | France . | |
| 0989371 | 4/1965 | United Kingdom | 525/65 |

*Primary Examiner*—Robert E. Sellers
*Attorney, Agent, or Firm*—Connolly and Hutz

[57] ABSTRACT

A film-forming composition comprises from 0.1-8% by weight of an oligomeric polyglycidyl ether or ester and a polymer mixture of a) a graft polymer prepared by polymerizing a monomer mixture of acrylonitrile, and alpha-methylstyrene and/or an alkylmethacrylate; or methylmethacrylate optionally with other monomers, onto cross-linked alkylacrylate rubber particles;

b) a partially cross-linked rubber-like copolymer derived from an alkylacrylate and other monomers;

c) an uncross-linked polymer of styrenes, (meth)acrylonitrile, (meth)acrylic acid esters and/or vinyl carboxylic acids; and optionally d) a graft polymer obtained from the polymerization of a mixture of acrylonitrile, and styrenes and/or an alkylmethacrylate; or methylmethacrylate optionally with other monomers, onto cross-linked alkylacrylate rubber particles.

1 Claim, No Drawings

POLYMER MIXTURES OF ALKYLMETHACRYLATE-GRAFTED ALKYLACRYLATE RUBBER WITH OLIGOEPOXIDE

This invention relates to polymer mixtures of acrylate graft rubbers, certain special acrylate copolymers and optionally resinous vinyl polymers containing special oligoepoxide compounds.

Polymer mixtures of acrylate graft rubbers, certain special acrylate copolymers and optionally resinous vinyl polymers, suitable for the fabrication of flexible, age-resistant films which have a leather-like appearance and capable of being processed by calendering and deep drawing are described in German Offenlegungsschriften 38 11 899 and 37 43 489. The films fabricated from the aforesaid polymer mixtures have a high level of properties and good age resistance. They are used, for example, for the internal trims of motor vehicles. In spite of the good resistance to ageing, also under the action of heat, compared with that of PVC-containing film moulding compounds hitherto commonly used, discolourations may occur in the films at high processing temperatures and/or long processing times, in particular in light coloured films, with the result that light colours may be difficult to reproduce exactly or be obtained in the exact shade. There was therefore a need for polymer mixtures which would have improved thermostability and thus avoid the abovementioned disadvantages.

It has been found the usual stabilizing agents conventionally used for PVC and/or ABS moulding compounds, such as alkyl tin mercaptides or phenolic or aminic antioxidants provide no improvement in age resistance in the abovementioned polymer mixtures.

It was surprisingly found, however, that special oligoepoxide compounds improve the thermostability of the above-mentioned polymer mixtures to such an extent that discolourations are greatly reduced, even at elevated operating temperatures and/or prolonged processing times.

The present invention therefore relates to polymer mixtures of acrylate graft rubbers, certain special acrylate copolymers and optionally resinous vinyl polymers, containing from 0.1 to 8% by weight, preferably from 0.5 to 6% by weight, of oligomeric polyglycidyl ethers of polyvalent phenols or alcohols or oligomeric polyglycidyl esters of polyvalent aromatic, aliphatic or cycloaliphatic carboxylic acids or mixtures of the oligomeric polyglycidyl ethers and oligomeric polyglycidyl esters.

The polyvalent phenols used for the oligomeric polyglycidyl ethers may be, for example, bisphenols such as bisphenol A, tetrabromobisphenol A, tetrachlorobisphenol A, tetramethylbisphenol A, bis-(4-hydroxyphenyl)-sulphone, 1,1-bis-(4-hydroxyphenyl)-cyclohexane or 2,4-bis-(4-hydroxyphenyl)-2-methylbutane, in particular bisphenol A. The polyhydric alcohols used are preferably diols such as butane-1,4-diol, ethanediol, propane-1,3-diol or hexane-1,6-diol.

The polybasic carboxylic acids used for the oligoglycidyl esters may be, for example, aromatic carboxylic acids having 8 to 19 carbon atoms, aliphatic carboxylic acids having 4 to 18 carbon atoms or cycloaliphatic carboxylic acids having 8 to 19 carbon atoms. Dicarboxylic acids are preferred, e.g. phthalic acid, hexahydrophthalic acid, tetrahydrophthalic acid or adipic acid.

It is particularly preferred to use diglycidyl esters of cycloaliphatic dicarboxylic acids having 8 to 19 carbon atoms, for example, hexahydrophthalic acid and tetrahydrophthalic acid.

The oligoepoxide compounds used for the polymer mixtures may also be prelengthened by a reaction with aliphatic or aromatic dicarboxylic acids, dimercaptans, hydrogen sulphide, ammonia or amines. The abovementioned oligoglycidylethers and oligoglycidylesters are known and are described in, for example, Kunststoffhandbuch, Volume XI, Chapter 3 (1971).

The polymer mixtures of acrylate graft rubbers, acrylate copolymers and optionally resinous vinyl polymers are described in DE-OS 38 11 899 and DE-OS 37 43 489, as mentioned above.

As disclosed in DE 38 11 899, which is incorporated herein by reference, such polymer mixtures comprise:

a) from 10–60 parts by weight, in particular from 20–50 parts by weight, of a graft polymer comprising:
  a1. mixtures of from 20–40% by weight of acrylonitrile and 80–60% by weight of α-methylstyrene, alkylmethacrylate or mixtures thereof, or
  a2. methylmethacrylate, optionally mixed with up to 30% by weight of styrene, acrylonitrile and/or alkylacrylate, or
  a3. a particulate, highly cross-linked alkylacrylate rubber with an average particle diameter ($d_{50}$) of from 100 to 800 nm which may contain up to 30% by weight of dienes, the graft polymers (a) having rubber contents of from 30–70% by weight, preferably from 45–65% by weight, most preferably from 50–60% by weight;

b) from 10–50 parts by weight, in particular from 10–40 parts by weight, of an at least partially cross-linked rubber-like copolymer of from 5–40% by weight of acrylonitrile, styrene, alkylmethacrylate or mixtures thereof and from 95–60% by weight of alkylacrylate and small amounts of a cross-linking monomer having a gel content of from 20–99% by weight, a swelling index above 10 determined in dimethylformamide at 23° C. and an average particle diameter ($d_{50}$) of from 100–600 nm, in particular from 100–300 nm;

c) from 5–80, preferably from 5–60, most preferably from 10–49, parts by weight of an uncross-linked polymer of styrenes, α-methylstyrenes, acrylonitrile, methacrylonitrile, esters of (meth)acrylic acid, vinyl $C_1$-$C_4$-carboxylic acids or mixtures of these monomers having Staudinger indices of from 0.3 to 1.5 dl/g (determined in toluene at 23° C.); and d) from 0–30, in particular from 5–25, parts by weight of a graft polymer comprising:
  d1. methylmethacrylate and optionally up to 30% by weight of styrene, acrylonitrile and/or alkylacrylate, or
  d2. a mixture of from 20–35% by weight of acrylonitrile and from 80–65% by weight of styrene, α-methylstyrene, alkylmethacrylate or mixtures thereof, on
  d3. a particulate, highly cross-linked alkylacrylate rubber which may contain up to 30% by weight of diene and has an average particle diameter ($d_{50}$) of from 100–800 nm, the graft polymer d) having a rubber content of from 70–90% by weight.

As disclosed in DE 37 43 489 (U.S. Pat. No. 5,047,473, incorporated by reference) such polymer mixtures comprise: soft, flexible polymer mixtures of a) 30–70 parts by weight of a graft polymer of a mixture of 25–40 parts by weight, in particular 30–40 parts by weight of acrylonitrile and 75–60 parts by weight, in particular 70 to 60 parts by weight of styrene, α-methylstyrene, alkyl methacrylate or mixtures thereof on particulate, highly cross-linked alkyl acrylate rubbers having an average particle diameter ($d_{50}$) of from 0.1 to 0.8 μm, with a total rubber content of 20–55% by weight, prepared with a graft yield greater than 25% by weight, preferably greater than 40% by weight, b) 60–5 parts by weight of a graft polymer of
   b1. methyl methacrylate, optionally in combination with up to 30% by weight of styrene, acrylonitrile and/or alkyl acrylate or
   b2. a mixture of 20–40% by weight of acrylonitrile and 80–60% by weight of styrene, α-methylstyrene, alkyl methacrylate or mixtures thereof
on a particulate, highly cross-linked alkyl acrylate rubber having an average particle diameter ($d_{50}$) of from 0.1 to 0.8 μm, with a total rubber content of 65–90% by weight, and c) 10–40 parts by weight of a partially cross-linked rubber-like copolymer of 5–40% by weight of acrylonitrile, styrene, alkylmethacrylate or mixtures thereof and 95–60% by weight of alkyl acrylate with a gel content of from 20 to 99% by weight and a swelling index greater than 10, determined in dimethylformamide at 23° C., and d) optionally up to 6% by weight, in particular from 1–5% by weight, based on the total quantity of a+b+c, of a resinous polymer of at least 60% by weight of styrene, o-methylstyrene or alkyl methacrylate and up to 40% by weight of acrylonitrile or methacrylonitrile with a Staudinger index (in dimethylformamide at 25° C.) of from 2–10 dl/g in particular from 2.5–6 dl/g.

The polymers of cyclic aliphatic esters and carbonates described in DE-OS 38 41 669 and/or the carbonate group-containing polyesters described in DE-OS 39 18 405 may be added as additional components to the polymer mixtures.

The polymers disclosed in DE 38 41 669 (U.S. Pat. No. 5,104,935, incorporated by reference) comprise mixtures of:

a) 10–60, especially 20 to 50 parts by weight of a graft polymer of
   a1. mixtures of 20 to 40 percent by weight of acrylonitrile and 80 to 60 percent by weight of styrene, α-methyl styrene, alkyl methacrylate or mixtures thereof, or
   a2. methyl methacrylate, optionally mixed with up to 30 percent by weight of styrene, acrylonitrile and/or alkyl acrylate, or
   a3. a particulate, highly crosslinked alkyl acrylate rubber which can have up to 30 percent by weight of dienes polymerized into it, with a mean particle diameter ($d_{50}$) of 80 to 800 nm, whereby the graft polymer (a) has a rubber content of 30 to 80 percent by weight, preferably 45 to 65 percent by weight, especially preferred 50 to 60 percent by weight, b) 10 to 50, especially 10 to 40, parts by weight of a partially crosslinked, rubber-like copolymer consisting of 5 to 40 percent by weight of acrylonitrile, styrene, alkyl methacrylate or mixtures thereof and 95 to 60 percent by weight of alkyl acrylate with a gel content of 20 to 99 percent by weight, a swelling index greater than 10 (measured in dimethyl formamide at a temperature of 23° C. [73.4° F.]) and a mean particle diameter ($d_{50}$) of 100 to 600 nm, especially of 100 to 300 nm, c) 5 to 40, especially 10 to 30, parts by weight of a non-crosslinked polymer consisting of styrenes, α-methyl styrenes, acrylonitrile, methacrylonitrile, esters of acrylic acid or methacrylic acid, vinyl-$C_1$–$C_4$-carboxylic acids or mixtures of these monomers with limiting viscosity indices (measured in dimethyl formamide at a temperature of 23° C. [73.4° F.]) of 0.3 to 1.5 dl/g and d) 5 to 40, especially 8 to 30, parts by weight of a polymer consisting of a cyclical aliphatic ester or a copolymer consisting of a cyclical aliphatic ester and a cyclical aliphatic carbonate, whereby the weight ratio of ester to carbonate ranges from 98:2 to 40:60.

The carbonate group containing polyesters described in DE 39 18 405 (U.S. Pat. No. 5,096,966, incorporated by reference) comprise polymer mixtures of a) 10 to 60, in particular 20 to 50 parts by weight of a graft polymer having a rubber content of 20 to 80 weight %, preferably 40 to 65 weight % and most preferably 50 to 60 weight % of
   a1. mixtures of 20 to 40 weight % of acrylonitrile and 80 to 60 weight % of styrenes and/or alkylmethacrylates or
   a2. methylmethacrylate, optionally mixed with up to 30, preferably 2 to 20 weight % of styrenes and/or up to 30, preferably 2 to 20 weight % of alkylacrylates and/or up to 19, preferably 2 to 25 weight % of acrylonitrile, onto
   a3. a particle-type highly cross-linked alkylacrylate rubber which may contain copolymerized up to 30, preferably 0.5 to 10 weight %, of dienes, having an average particle diameter ($d_{50}$) of 80 to 1000 nm, b) 10 to 50, in particular 10 to 40 parts by weight of a partially cross-linking rubber-type copolymer made from 5 to 40, preferably 10 to 35 weight %, of acrylonitrile, styrene, alkylmethacrylate or mixtures thereof and 95 to 60, preferably 90 to 65 weight %, of alkylacrylate having a gel content of 20 to 99 weight %, a swelling index greater than 10, measured in dimethylformamide at 23° C., and an average particle diameter ($d_{50}$) of 100 to 600 nm, in particular 100 to 300 nm, c) 5 to 40, preferably 10 to 30 parts by weight of a non-crosslinked polymer of styrenes, acrylonitrile, methacrylonitrile, esters of (meth)acrylic acid, vinyl-$C_1$–$C_4$-carboxylic acids or mixtures of these monomers having Staudinger indices [η] (measured in dimethylformamide at 23° C.) of 0.3 to 1.5 dl/g, and d) 1 to 40, in particular 5 to 30 parts by weight of a polyester containing carbonate groups and having recurring structural units of the formula

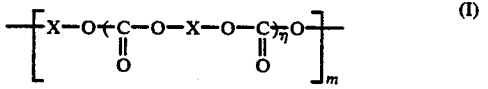

in which

X is the radical of a reaction product of a multivalent alcohol and a multivalent aliphatic carboxylic acid having a molecular weight of 800 to 5,000, X'=X or is the radical of an aliphatic polyether of molecular weight 800 to 5,000, n=0 or is a 1 to 20, and m denotes a number greater than 20, preferably 22 to 100.

Polymer mixtures containing resinous vinyl polymers as-third component are preferably used.

In addition, the polymer mixtures according to the invention may contain the usual quantities of known and conventional additives and processing auxiliaries.

The polymer mixtures according to the invention may be used inter alia for the fabrication of a wide variety of films and sheet products.

EXAMPLES

A polymer mixture is prepared according to DE-OS 38 11 899 from 45% by weight of an acrylate graft rubber described there (Component a1 of the Examples), 40% by weight of a cross-linked butyl acrylate/acrylonitrile copolymer (Component b of the Examples) and 15% by weight of a styrene/acrylonitrile resin (Component c of the Examples). This mixture is mixed on a roller with 3% by weight of titanium dioxide pigment (Bayertitan R-FKD), 0.3% by weight of Lichtblau 100 (of Bayer AG), 0.3% by weight of Loxiol G70 (of Henkel) and the components shown in the Table. The thermostability is tested by rolling at 200° C. and assessed optically on the basis of any colour changes observed.

TABLE

Additions to the polymer mixtures (in parts by weight, based on 100 parts by weight of the initial moulding compound)

| Example No. | Hexhydrophthalic acid diglycidyl ester (Component A) | Polycaprolacton ($M_w$ = 40,000) (g/mol) | Plastiflo AO1 (of Atochem) |
|---|---|---|---|
| 1 | 1 | — | — |
| 2 | 2 | 5 | — |
| 3 | 1 | 5 | 2.5 |
| 4 | 1 | 10 | 5 |
| 5 | 6 | 10 | 5 |

COMPARISON EXAMPLES (6-9)

Comparison polymer mixtures are prepared analogously to Examples 1 to 4 but without Component A.

Whereas the Comparison moulding compounds 6 to 9 undergo a slight discolouration after only 10 minutes' rolling at 200° C. and a pronounced colour change from light blue to green after 20 minutes, there is virtually no discolouration of the moulding compounds according to the invention 1 to 5 observed after 10 minutes rolling and only a slight greenish tinge is observed after 20 minutes. No colour change can be seen in the moulding compound of Example 5 even after 20 minutes.

We claim:

1. Thermoplastically processable polymer mixtures containing from 0.1 to 8% by weight of oligomeric polyglycidyl ethers of polyvalent phenols or alcohols, or oligomeric polyglycidyl esters of polyvalent aromatic, aliphatic or cycloaliphatic carboxylic acid, or mixtures thereof, and wherein the polymer mixtures comprise either a first polymer mixture of a) from 10–60 parts by weight of a graft polymer comprising:

a1. mixtures of from 20–40% by weight of acrylonitrile and 80–60% by weight of α-methylstyrene, alkylmethacrylate or mixtures thereof, or a2. methylmethacrylate, optionally mixed with up to 30% by weight of styrene, acrylonitrile and/or alkylacrylate other than mixtures a1, on a3. a particulate, highly cross-linked alkylacrylate rubber with an average particle diameter ($d_{50}$) of from 100 to 800 nm which may contain up to 30% by weight of dienes, the graft polymers (a) having rubber contents of from 30–70% by weight;

b) from 10–50 parts by weight of an a cross-linked rubber-like copolymer of from 5–40% by weight of acrylonitrile, styrene, alkylmethacrylate or mixtures thereof and from 95–60% by weight of alkylacrylate and small amounts of a cross-linking monomer having a gel content of from 20–99% by weight, a swelling index above 10 determined in dimethylformamide at 23° C. and an average particle diameter ($d_{50}$) of from 100–600 nm;

c) from 5–80 parts by weight of an uncross-linked polymer of styrene, α-methylstyrene, acrylonitrile, methacrylonitrile, esters of (meth)acrylic acid, vinyl $C_1$–$C_4$-carboxylic acids or mixtures of these monomers having Staudinger indices of from 0.3 to 1.5 dl/g (determined in toluene at 23° C.); and d) from 0–30 parts by weight of a graft polymer comprising:

d1. methylmethacrylate and optionally up to 30% by weight of styrene, acrylonitrile and/or alkylacrylate, or d2. a mixture, other than d1, of from 20–35% by weight of acrylonitrile and from 80–65% by weight of styrene, α-methylstyrene, alkylmethacrylate or mixtures thereof, on d3. a particulate, highly cross-linked alkylacrylate rubber which may contain up to 30% by weight of diene and has an average particle diameter ($d_{50}$) of from 100–800 nm, the graft polymer d) having a rubber content of from 70–90% by weight, or a second polymer mixture other than said first polymer mixture of a) 30–70 parts by weight of a graft polymer of a mixture of 25–40 parts by weight of acrylonitrile and 75–60 parts by weight of styrene, α-methylstyrene, alkyl methacrylate or mixtures thereof on particulate, highly cross-linked alkyl acrylate rubbers having an average particle diameter ($d_{50}$) of from 0.1 to 0.8 μm, with a total rubber content of 20–55% by weight, prepared with a graft yield greater than 25% by weight, b) 60–5 parts by weight of a graft polymer other than graft polymer a)

b1. methyl methacrylate, optionally in combination with up to 30% by weight of styrene, acrylonitrile and/or alkyl acrylate or b2. a mixture, other than b1, of 20–40% by weight of acrylonitrile and 80–60% by weight of styrene, α-methylstyrene, alkyl methacrylate or mixtures thereof on a particulate, highly cross-linked alkyl acrylate rubber having an average particle diameter ($d_{50}$) of from 0.1 to 0.8 μm, with a total rubber content of 65–90% by weight, and c) 10–40 parts by weight of a partially cross-linked rubber-like copolymer of 5–40% by weight of acrylonitrile, styrene, alkylmethacrylate or mixtures thereof and 95–60% by weight of alkyl acrylate with a gel content of from 20 to 99% by weight and a swelling index greater than 10, determined in dimethylformamide at 23° C., and
d) optionally up to 6% by weight, based on the total quantity of a+b+c, of a resinous polymer of at least 60% by weight of styrene, o-methylstyrene or alkyl methacrylate and up to 40% by weight of acrylonitrile or methacrylonitrile with a Staudinger index (in dimethylformamide at 25° C.) of from 2–10 dl/g.

* * * * *